United States Patent

[11] 3,561,467

[72] Inventor Sepp Lutz
 Giengen (Brenz), Germany
[21] Appl. No. 762,423
[22] Filed Sept. 25, 1968
[45] Patented Feb. 9, 1971
[73] Assignee Alligator Ventilfabrik Gesellschaft Mit
 Beschrankter Haftung
 Griengen, Germany
[32] Priority Sept. 30, 1967
[33] Germany
[31] A28,474

[54] VALVE CASE CONSTRUCTION
 7 Claims, 2 Drawing Figs.
[52] U.S. Cl. ........................................................ 137/234.5,
 251/120, 251/368
[51] Int. Cl. ........................................................ F16k 15/20
[50] Field of Search ............................................ 137/223,
 234.5; 251/368, 210; 260/92.1; 251/120;
 137/234.5(Modern Plastics); 260/92.1

[56] References Cited
 UNITED STATES PATENTS
2,048,843 7/1936 Crowley ...................... 137/234.5
2,932,531 4/1960 Briechle ...................... 137/234.5X
3,140,728 7/1964 Webb .......................... 251/210X FOREIGN PATENTS
725,236 3/1955 Great Britain ................ 137/234.5

Primary Examiner—Harold W. Weakley
Attorney—McGlew and Toren

ABSTRACT: A valve case construction particularly for use for tire valves includes a tubular housing having an exterior surface with an annular groove into which is inserted a gasket of a material having very little sensitivity to temperature and which has little or no tendency toward cold flow, such as a polyvinylidene fluoride. The gasket includes fins, or teeth, which project into corresponding recesses of the valve case housing groove base. The valve case housing also includes an inwardly extending depression in the groove which provides a free space behind the gasket into which the gasket may yield under stress. The valve case also includes an indented wall forming a shoulder for the valve spring and a widened interior area immediately before the shoulder to facilitate the air flow through the housing. The valve rod includes a disc seal which is adapted to bear against the end of the housing in a closed position and it is provided with a conical portion adjacent the seal having a plurality of radial grooves distributed uniformly around its circumference which connect tangentially into the surface of the seal and provide a streamlined flow for the air which is thus directed over the surface of the seal and insures that it is maintained clean.

FIG. 1
FIG. 2
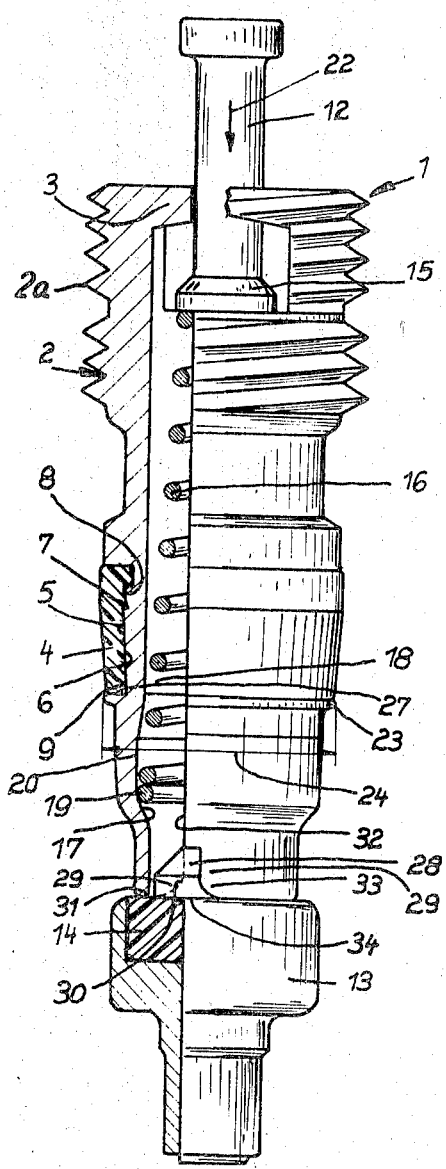
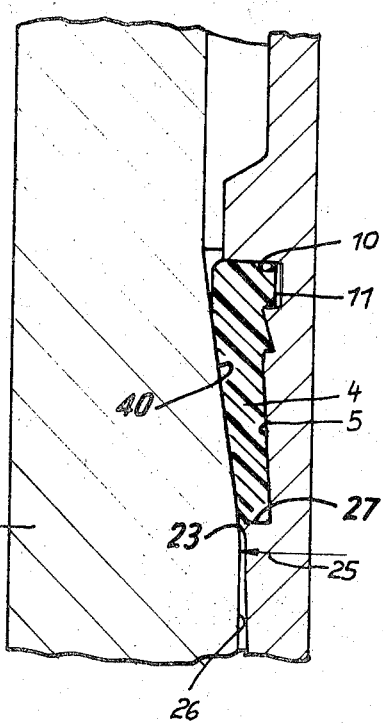
INVENTOR
SEPP LUTZ
BY
McGlew & Toren
ATTORNEYS

3,561,467

VALVE CASE CONSTRUCTION

SUMMARY OF THE INVENTION

This invention relates, in general, to the construction of valve cases for tires and, in particular, to a new and useful valve case construction having a valve case housing with an exterior annular groove which accommodates a gasket of a material which is relatively insensitive to temperature; and to a valve case housing having improved air flow conditions therethrough and to a valve rod within the housing that provides for a cleaning of the valve closing disc by the directing of the air over the surface thereof.

It is known to construct a valve case housing with an exterior annular gasket of a material such as tetrafluorethylene-polymer. This material has the advantage that it is relatively insensitive to temperature and does not stick to the metal. When using such material, it is possible to eliminate a swivel joint connection between the valve case housing and the tire insert which is required in the case of rubber gaskets. This is true because the gasket material can turn safely with respect to the valve case. When turning with the valve case does occur, a moment of rotation of 2 ½cmkp is generally expended. Due to the resultant pressure, the material of known gaskets begins to flow cold so that a deformation results which jeopardizes the sealing of the valve.

In order to provide a valve case having a packing which shows no cold flow under ordinary usage and maintains the advantages of the known gaskets, the gasket according to the invention consists of a polyvinylidene fluoride which is known under the trade name "KYNAR." For the intended use, the absence of a cold flow characteristic is a substantial advantage since a tight bearing of the gasket on the metal of the valve body is now insured even with a far greater moments of rotation. This material, similar to tetrafluorethylene-polymer is particularly temperatures resistant. Although the material will corrode at temperatures outside the range of between $-55$ and $+230°$ C., this temperature range is completely sufficient for the intended purpose. The material will not stick to the metal. A polyvinylidene fluoride is used for insulating cables but it has not been known to employ it for use in a valve casing where a material which does not have any cold flow is desirable. Its use therefore, does provide a new and surprising technical effect in its application as an exterior gasket of a valve case housing.

The invention provides a valve case housing having an exterior annular groove and with recesses defined at the inner wall or base of the groove for accommodating fins, teeth or other projecting surfaces of an annular gasket which is accommodated in the groove. The gasket is designed to abut against a torrodial-shaped portion of the exterior wall of the housing which has an exterior dimension at least as great as the exterior or dimension of valve shaft in which the case is to be positioned. In addition, the housing is provided with an inwardly extending depression in the base of the annular groove which accommodates the inward movement of the gasket in order to permit yielding of the gasket under stress.

In accordance with another feature of the invention, the valve case housing is provided with an indented portion wherein the metal of the housing is forced inwardly to form an interior shoulder after the valve rod and surrounding return spring is inserted into the housing. The interior shoulder provides an abutment against which the spring rests in the formed position. The housing is also provided with a widened area directly before the abutment, in respect to the direction of incoming air flow during filling, and which improves the air flow conditions through the valve case housing. The inwardly extending shoulder or abutment corresponds to the standard automobile tire interior case housing dimension. In this way, the air passage space can be kept relatively large without deviating from the standard dimension so that the valve case housing may be used for ordinary motor vehicle tires.

A further feature of the valve housing construction is the provision of an annular bead or torus on the exterior surface against which the gasket abuts. The outer edge of the torus bears on the inner bore of the valve shaft with which the valve case is to be employed so that an additional sealing between the shaft and the case is achieved. The two parts would thus be sealed in respect to each other even when the gasket drops out which may occur, for example, by improper assembly of the case or by using automatic screwing devices. If the torus or bead is formed with a greater diameter than the bore of the valve shaft at its associated point, it will bend due to its small thickness during assembly and will bear particularly tightly on the inner wall of the valve shaft. The upper end of the torus forms a wall of the groove which accommodates the annular gasket.

In accordance with another feature of the invention, the valve rod or valve needle has a conical portion adjacent a widened sealing disc which abuts against the end of the housing in a closed position. The conical portion is provided with radial grooves arranged around its circumference which connect tangentially into the surface of the valve disc and thus provide a smooth air flow directing surface which is directed over the top of the valve disc and provides a cleaning action.

Accordingly, it is an object of the invention to provide an improved valve case housing having an exterior annular groove accommodating gasket which shows no cold flow characteristics during normal operation.

A further object of the invention is to provide a valve case housing having an exterior annular groove accommodating a gasket and with interior recesses for accommodating projecting portions of fins of the gasket and a further inwardly extending portion of the groove providing a space for accommodating a yielding movement of the gasket, the housing also including an annular bead which abuts against the lower end of the gasket and projects outwardly from the surface of the case housing to provide a further seal with the valve shaft.

A further object of the invention is to provide a valve case housing having an interior formed with an inwardly extending shoulder providing a lower stop for a valve spring and wherein the housing is widened directly adjacent the shoulder to permit improved air flow conditions, the valve rod or valve needle being accommodated in the housing and having a conical base portion directly adjacent a valve disc insert portion which abuts against the end of the housing, the conical base being provided with grooves shaped to direct tangential air flow over the surface of the valve disc insert to provide a cleaning action thereupon.

A further object of the invention is to provide a valve case housing which is simple in design, rugged in construction and economical to manufacture.

The various features of novelty which characterize the invention are pointed out with particularity in the claims annexed to and forming a part of this specification. For better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is a partial elevational and partial sectional view of a valve case constructed in accordance with the invention; and FIG. 2 is an enlarged sectional view of a portion of the valve case indicated in FIG. 1.

DETAILED DESCRIPTION OF THE PREFERRED EMBODIMENT

Referring to the drawings, in particular, the invention embodied therein comprises a valve case generally designated 1 which includes a valve case housing generally designated 2 having an inwardly extending web 3 at its one end. This one end is also externally threaded at 2a to provide for a means for connecting the case to a valve shaft (not shown).

In accordance with the invention, the valve housing 2 is provided with an annular groove 5 for accommodating a gasket 4 of a material which is not sensitive to temperature during ordinary operating conditions. The material employed for the gasket 4, in accordance with the invention, is a polyvinylidene fluoride which is known under the trade name or trade mark "KYNAR." In accordance with a feature of the invention, the gasket 4 is provided with an inner surface 6 having fins or projecting teeth 7 which engage into corresponding recesses 8 cut into the base 9 of the annular groove 5. The fins 7 prevent axial displacement of the gasket 4 with respect to the valve case housing 2. In addition, to the annular groove 5 there is provided an offset depression or inward extension 10 into which the gasket 4 protrudes only partly. Under very great pressure, the material of the gasket 4 can yield into the free space 11 thus provided.

In accordance with a further feature of the invention, a valve rod 12 of the valve case 1 includes a bottom end or valve disc portion 13 having an inserted seal disc 14 therein which abuts against the lower end of the valves case housing 2 when the valve is in the closed position indicated. The valve rod 12 includes a shoulder portion 15 against which the upper end of the return spring 16 abuts. The lower end of the return spring 16 abuts against a shoulder 17 formed by indenting the valve case housing 12 inwardly after the spring and rod are inserted into the housing.

The valve case housing 2 is provided with an interior bore 18 which is widened or provided with a widening 20 adjacent the lower end 19 of the spring 12. This widening 20 directly before the shoulder 17 in respect to the direction of the air flow as indicated by the arrow 22 permits a greater passage of air through the housing. The bore of the shoulder 17 is adapted to the usual standard dimension for automobile tire case housings.

As indicated, particularly, in FIG. 2, the gasket 4 is arranged to abut against a shoulder portion 40 of the bore 26 of a valve shaft 21 which is partially indicated. In accordance with a further feature of the invention, the valve case housing is formed with a radially extending torus or bead 23 which is disposed in front of the gasket 4. The exterior diameter of the torus 23 is made slightly greater than the diameter of the valve bore 26 so that there is a further sealing action between the torus and the valve shaft. The outer surface 27 of the torus 23 forms the front side wall of the annular groove 5 for the gasket 4 in respect to the valve filling direction indicated by the arrow 22.

The valve rod 12 is also provided with a valve cone 28 which, in accordance with a further feature of the invention, is provided with four radial grooves 29 which are distributed uniformly around the circumference. The bottom 30 of each groove has an arcuated form and the transition of the arc to the surface 31 of the seal 14 as well as the transition to the surface 32 of the valve rod 12 is tangential. In this manner the air flowing along the valve needle 12 is deflected by the grooves and flows in a horizontal direction over the surface 31 of the seal 14 and into the following bore portion of the shaft 21. The construction provides a deflecting air flow which insures that there will be no deposit of any foreign particles on the surface 31 of the seal 14. The cross section of the grooves 29 are also arcuate. The course of the groove end 33 seen in the direction of flow is selected so that the front circular surface 34 of the valve 28 which bears on the surface 31 of the seal 14 is maintained.

I claim:

1. A valve case, particularly for threading into the tubular valve shaft of a pneumatic tire or tube, comprising, in combination, a one-piece valve case housing, of tubular configuration, having external threads at its outer end for screwing of the valve case housing into a tubular valve shaft having internal threads; said housing having an annular groove in its external surface intermediate its ends; a sealing gasket in said groove engageable with the internal surface of the valve shaft when said housing is screwed into the valve shaft; said gasket consisting of a synthetic resin which is substantially temperature insensitive and substantially nonadherent to metal, and which is free of cold flow; the interior surface of said gasket and the base of said groove having interfitting formations preventing relative axial displacement of said gasket along said housing; a valve stem extending through said housing and projecting from the outer end of said housing, and having a substantially conical annular rib adjacent the inner end of said housing; said stem having a valve disc portion, adjacent said conical rib and exteriorly of said housing, including a sealing insert abutting against the inner end of said housing to close said housing; said conical annular rib being formed with at least one radial groove, for air flow, which is arcuate in an axial plane, substantially tangent at one end to said valve stem, and substantially tangent at the opposite end to the surface of said insert.

2. A valve case, according to claim 1, wherein said gasket is provided with an interior surface having a projecting fin, said annular groove of the valve case housing having a base with an inwardly directed portion for accommodating the projecting fin for securing said gasket against axial displacement.

3. A valve case, according to claim 1 wherein said valve case housing is provided with a depression at the base of said annular groove into which said gasket protrudes only partly, the remaining portion providing a space for the yielding of said gasket.

4. A valve case, according to claim 1, having a threaded part adjacent its one end and an indented part adjacent its opposite end forming a shoulder on the interior thereof, a valve stem in said housing, a valve return spring abutting against said stem at its one end and against said shoulder at its opposite end.

5. A valve case, according to claim 4, wherein said housing is provided with a widening on the interior directly adjacent said shoulder, the bore at said shoulder corresponding to the standard tire dimension.

6. A valve case, according to claim 1, wherein the exterior of said valve case housing is provided with a bead which projects outwardly, the maximum diameter of said bead being at least equal to the diameter of the bore of the valve shaft with which it is to be employed.

7. A valve case, according to claim 6, wherein said bead has a surface against which said annular gasket abuts disposed on its upstream side in respect to the filling direction.